(12) United States Patent
Morito et al.

(10) Patent No.: US 10,727,761 B2
(45) Date of Patent: Jul. 28, 2020

(54) POWER CONVERSION APPARATUS

(71) Applicant: Toshiba Mitsubishi-Electric Industrial Systems Corporation, Chuo-ku (JP)

(72) Inventors: Chikara Morito, Chuo (JP); Hiromitsu Suzuki, Chuo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 16/503,659

(22) Filed: Jul. 5, 2019

(65) Prior Publication Data
US 2019/0334455 A1 Oct. 31, 2019

Related U.S. Application Data

(63) Continuation of application No. PCT/JP2017/000598, filed on Jan. 11, 2017.

(51) Int. Cl.
*H02M 7/5395* (2006.01)
*H02M 1/08* (2006.01)
(Continued)

(52) U.S. Cl.
CPC ............ *H02M 7/5395* (2013.01); *H02M 1/08* (2013.01); *H02M 7/493* (2013.01); *H02P 27/08* (2013.01); *H02M 2001/0009* (2013.01)

(58) Field of Classification Search
CPC ....... H02M 1/08; H02M 7/493; H02M 7/5395; H02P 27/08
(Continued)

(56) References Cited

U.S. PATENT DOCUMENTS 3,651,403 A * 3/1972 Fluck, Jr. ............... H04N 17/00
                                                                   725/144
4,371,840 A * 2/1983 Yokoyama .............. H03F 3/217
                                                                   330/10
(Continued)

FOREIGN PATENT DOCUMENTS

JP          2515903       7/1996
JP          2002-10684    1/2002
(Continued)

OTHER PUBLICATIONS

International Search Report dated Mar. 28, 2017 in PCT/JP2017/000598, filed on Jan. 11, 2017.

*Primary Examiner* — Jorge L Carrasquillo
(74) *Attorney, Agent, or Firm* — Oblon, McClelland, Maier & Neustadt, L.L.P.

(57) ABSTRACT

In a motor drive system with inverter parallel connection, a laying cable impedance is identified by a test pulse, and a cross current suppression control gain is optimized to provide a power conversion apparatus that does not require a coupling reactor. In the motor drive system 1 in which the outputs of A-bank and B-bank inverters 20A and 20B are connected in parallel, a test pulse is outputted from the drive control unit 30 provided with the PWM controller 33 to the A and B bank inverters before operation. The laying cable impedance is identified from the DC voltage Vdc at the time of test pulse output and the response currents IA and IB. An adjustment gain is calculated from the ratio of installed cable impedance to specified cable impedance. Then, the proportional gain KP is multiplied to optimize the adjustment gain, and an on-delay time based on the optimized adjustment gain GL×KP is calculated during operation. The gate signal corrected by the calculated on-delay time is outputted to the corresponding inverter gate.

5 Claims, 7 Drawing Sheets

(51) Int. Cl.
    *H02M 7/493* (2007.01)
    *H02P 27/08* (2006.01)
    *H02M 1/00* (2006.01)
(58) Field of Classification Search
    USPC .......................................................... 318/474
    See application file for complete search history.

(56) References Cited

U.S. PATENT DOCUMENTS

| | | | | |
|---|---|---|---|---|
| 6,492,790 | B2* | 12/2002 | Yoshikawa | ............ H02M 7/493 |
| | | | | 318/727 |
| 6,620,186 | B2* | 9/2003 | Saphon | .................... A61N 1/08 |
| | | | | 607/1 |
| 2003/0038624 | A1* | 2/2003 | Hilliard | ................. G08G 1/042 |
| | | | | 324/200 |
| 2008/0107134 | A1* | 5/2008 | Okazaki | ................. H04B 1/707 |
| | | | | 370/479 |

FOREIGN PATENT DOCUMENTS

| | | |
|---|---|---|
| JP | 2003-134832 | 5/2003 |
| JP | 2006-42407 | 2/2006 |
| JP | 2007-151213 | 6/2007 |
| JP | 2016-82661 | 5/2016 |

* cited by examiner

POWER CONVERSION APPARATUS

CROSS-REFERENCE TO RELATED APPLICATION

This application is based upon and claims the benefit of priority from the prior PCT Patent Application No. PCT/JP2017/00598, filed on Jan. 11, 2017, the entire contents of which are incorporated herein by reference.

TECHNICAL FIELD

The embodiment of the present invention relates to a power conversion apparatus having a cross current suppressing control means in a large capacity inverter in which outputs of PWM power converters are connected in parallel.

BACKGROUND ART

When driving a large-capacity motor, it is necessary to increase the capacity of a PWM power converter (hereinafter referred to as an inverter) that controls speed and torque of the motor. One way to increase the capacity of the inverter is to connect the outputs of a plurality of inverters in parallel to increase an output current.

In the case of a single winding motor, each inverter drives the motor via a coupling reactor. Then output current is unbalanced due to individual switching difference of the inverter element, variation in cable impedance. This unbalance causes unnecessary circulating current called cross current between the inverters.

As a control method for suppressing this cross current, there are Patent documents 1 and Patent document 2. These are to reduce the size of the coupling reactor on the premise that the cross current suppression control gain is appropriately set, and these are not the methods that enables the motor to be driven by parallel connection of inverters in a reactor-less manner.

In addition to the above, as a cross current suppression control method that enables parallel operation with reactor-less operation, there are methods described in Patent document 3. In the case where the object to be driven is a multi-winding motor, by using the magnetic coupling between the stator windings as a substitute for the reactor, it is possible to obtain a reduction in size and cost reduction effect of the reactor due to reactor-less way.

PRIOR ART DOCUMENT

Patent Document

Patent document 1: Japanese Patent No. 2515903
Patent document 2: Japanese Patent Application Publication No. 2003-134832
Patent document 3: Japanese Patent Application Publication No. 2002-10684

SUMMARY OF THE INVENTION

Problem to be Solved by the Invention

In the above-mentioned prior art documents, it is premised that the cross current suppression control performance is optimized, that is, the cross current suppression control gain is properly set. The method of determining the gain is empirically and variously derived, such as deriving from a stability condition of a transfer function. However, since the derived gain is a rough estimate in any case, actually it is necessary to perform tuning in an actual machine. In the cross current suppressing control, unless the gain is appropriately set, a suppression effect cannot be expected level, and there is a problem that the current imbalance increases due to the gain incompatibility. Especially in motor driven by reactor-less parallel connection depending on cable impedance, gain adjustment in real machine is required for effective cross current suppression control, because the cable impedance reflects different cable length difference for each installation.

The present invention has been made to solve the problems described above. An object of the present invention is to provide a power conversion apparatus as described below in a motor drive system with reactor-less inverter parallel connection. That is, before operation of the motor, a test pulse is outputted to the inverter constituting the system, and the installed cable impedance is identified from the inverter DC voltage and the response current at that time. Thereby, the cross current suppression control gain is adjusted. Therefore, it is possible to provide the power conversion apparatus provided with the cross current suppression control means which is not influenced by an installation situation.

Means for Solving the Problem

In order to achieve the above object, a power conversion apparatus according to claim 1 of the present invention configured to drive a motor has a plurality of PWM power converters with a common DC circuit and with their outputs connected in parallel, a drive controller for controlling the plurality of PWM power converters, wherein, the drive controller is composed of, a PWM controller for outputting a PWM command for controlling a gate of semiconductor elements constituting the PWM power converter, a DC voltage detection means for detecting DC voltage values supplied to the PWM power converters of the plurality of banks, current detection means for detecting the output currents of the PWM power converters of the plurality of banks respectively, a test pulse output means for outputting the test pulse for turning on/off the positive side semiconductor element and the negative side semiconductor element set by the number of parallel connection, an impedance identification means for identifying a laying cable impedance from an output current acquired by the current detection means, at the time of test pulse generation output by the test pulse output means before operation of the motor, and from a DC voltage of the PWM converter acquired by the DC voltage detection means, an adjustment gain calculation means for calculating adjustment gain of cross current suppression control based on the ratio of the installation cable impedance identified by the impedance identification means to the specification cable impedance calculated from the specification of the installation cable, and a PWM command correction means during motor drive operation for correcting the PWM command output from the PWM controller by the adjustment gain calculated by the adjustment gain calculation means before motor drive operation.

Here, the specification cable impedance is the multiplied impedance value of the laying cable impedance per unit length in the specification of the cable used for the output side of the power conversion apparatus and the length of the laying cable from the PWM power converter to the motor of each bank.

Effects of the Invention

According to the present invention, in a motor drive system in reactor-less inverter parallel connection, by identifying the cable impedance of each phase and by optimizing the cross current suppression control adjustment gain by giving the test pulse before the operation of the motor, it is possible to optimize the control performance of the cross current suppression control and to enable automatic tuning that allows the coordinator to omit the adjustment of the cross current suppression control gain by the actual machine.

EMBODIMENT TO PRACTICE THE INVENTION

Hereinafter, embodiment of the present invention will be described with reference to the drawings.

Embodiment 1

Figure 1:
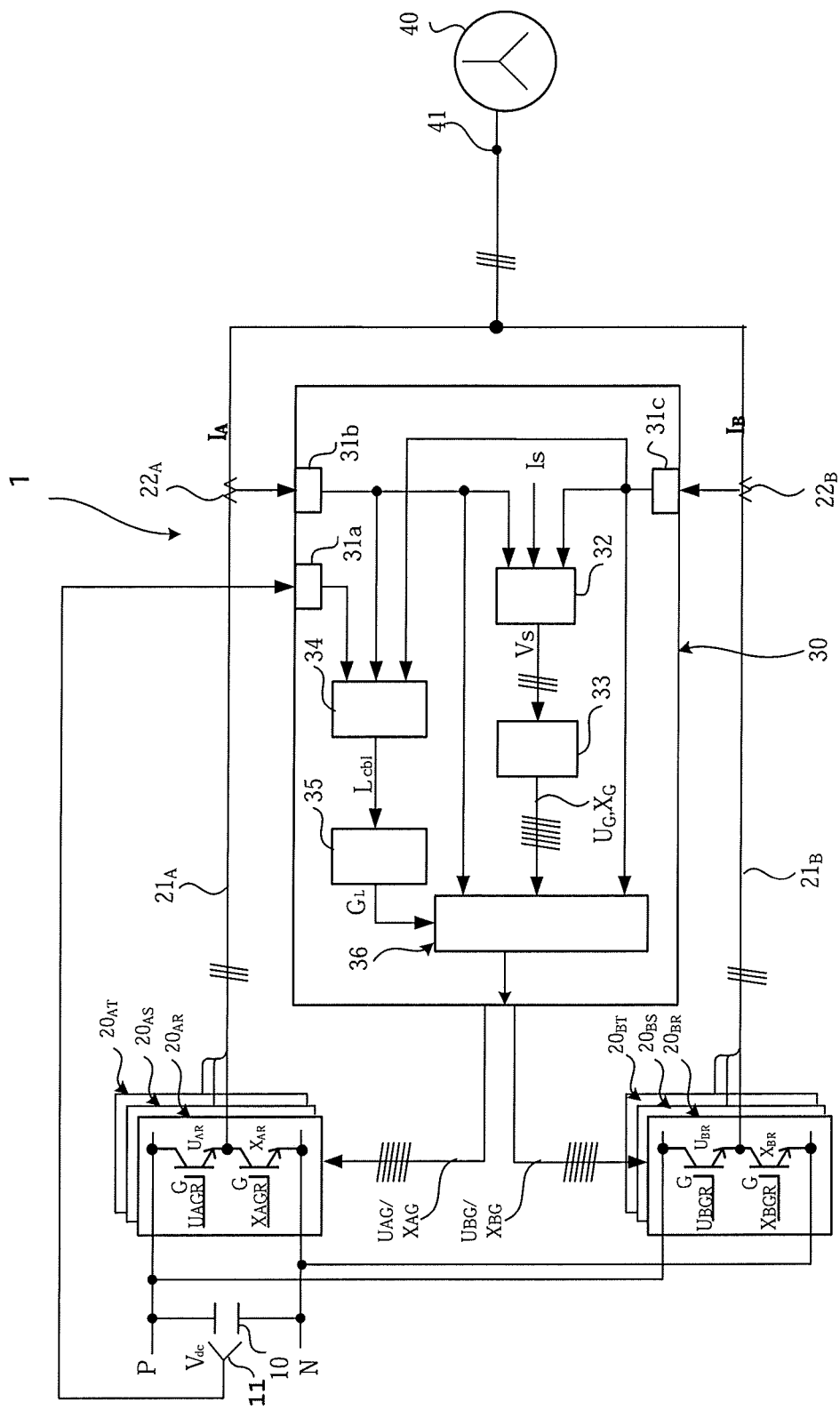
FIG. 1 A schematic configuration diagram of an AC motor drive system 1 when two inverters are connected in parallel in a reactor-less manner according to a first embodiment.

FIG. 1 is a configuration diagram of a motor drive system 1 when two inverters are connected in a reactor-less manner according to the first embodiment (that is, a 2-bank configuration). The motor drive system 1 includes an A-bank inverter 20A (PWM power converter), a B-bank inverter 20B (PWM power converter), and a drive controller 30. Here, the A-bank inverter 20A and the B-bank inverter 20B are three-phase PWM converters each having a 6-arm configuration.

The A-bank power line 21A of an output of the A-bank inverter 20A and the B-bank power line 21B of an output of the B-bank inverter 20B are connected in parallel at a terminal side of the motor 40. Each of the A-bank inverter 20A and the B-bank inverter 20B is a voltage type inverter using a semiconductor element such as IGBT (Insulated Gate Bipolar Transistor) or the like, and their input side is connected to a DC power supply (P pole, N pole) not shown. A voltage of the DC power supply is detected by a DC voltage detector 11. A smoothing capacitor 10 connected between the P pole and the N pole of DC power supply removes the pulsating current contained in the direct current supplied to the A-bank inverter 20A and the B-bank inverter 20B.

Three-phase AC power consisting of R-phase, S-phase and T-phase is outputted from the A-bank power line 21A of the A-bank inverter 20A and the B-bank power line 21B of the output of the B-bank inverter 20B. The three-phase AC outputs (R-phase, S-phase, T-phase) of the A-bank inverter 20A and the three phase AC outputs (R-phase, S-phase, T-phase) of the B-bank inverter 20B are supplied to a three phase input terminal 41 of the motor 40 by each R-phase, S-phase and T-phase individually.

The current IA (generic name of the R-phase current IAR, the S-phase current IAS, the T-phase current IAT) of the A-bank power line 21A is detected by the A-bank current sensor 22A, and inputted to the A/D converter (Analog to Digital Converter) 31b. Similarly, the current IB (generic name of the R-phase current IBR, the S-phase current IBS, and the T-phase current IBT) of the B-bank power line 21B is detected by the B-bank current sensor 22B, and inputted to the A/D converter 31c.

By performing such a connection, the motor 40 is driven by the A-bank inverter 20A and the B-bank inverter 20B connected in parallel, and the current during driving is detected by the A-bank current sensor 22A and the B-bank current sensor 22B. The drive controller 30 includes the A/D converters 31a, 31b, and 31c, the current controller 32, the PWM controller 33, the impedance identification unit 34, the adjustment gain calculation unit 35, the cross current suppression controller 36.

The A/D converter 31a converts the DC voltage (analog data) between the P-pole and the N-pole supplied to the A-bank inverter 20A and the B-bank inverter 20B to a voltage value of digital data (hereinafter referred to as a voltage). The converted DC voltage is inputted to the impedance identifying unit 34.

The A/D converter 31b converts the 3-phase current values IAR, IAS, and IAT (analog data) of the A-bank power line 21A detected by the A-bank current sensor 22A into current values of the digital data (hereinafter referred to as A-bank inverter output current IAR, IAS, and IAT). The converted A-bank inverter output currents IAR, IAS, and IAT are inputted to the current controller 32, the impedance identifying unit 34, and the cross current suppression controller 36. Here, the current values IAR, IAS, and IAT for the three phases indicate instantaneous values.

The A/D converter 31c converts the current values IBR, IBS, and IBT (analog data) of the three phases of the B bank power line 21B detected by the B-bank current sensor 22B into current values of digital data (hereinafter referred to as B-bank inverter output current). The converted B-bank inverter output current is inputted to the current controller 32, the impedance identifying unit 34 (impedance identifying means), and the cross current suppression controller 36. The current values IBR, IBS and IBT for the three phases indicate instantaneous values.

The current controller 32 generates and outputs the reference voltage VS from the calculated average currents IavR, IavS and IavT for each phase and the preset reference current IS. The averaging processing unit 361 (averaging processing means) calculates the average current IavR, IavS and IavT of the output currents of the A-bank inverter 20A and the B-bank inverter 20B based on the A-bank inverter output currents IAR, IAS and IAT acquired from the A/D converter 31b and the B-bank inverter output currents IBR, IBS and IBT acquired from the A/D converter 31c.

The reference current IS is a generic term for the R-phase reference current VSR, the S-phase reference current VSS, and the T-phase reference current VST set for each phase. Similarly, the reference voltage VS is a generic term of the R-phase reference voltage VSR, the S-phase reference voltage VSS, and the T-phase reference voltage VST set for each phase. Hereinafter, in order to simplify the explanation, it is sometimes described using the reference current IS and the reference voltage VS, except when particularly specified.

The PWM controller 33 receives the reference voltage VS output from the current controller 32, sets and outputs PWM commands for six arms. The outputted PWM command is inputted to the cross current suppression controller 36.

The cross current suppression controller 36 outputs the gate signals (UAG, XAG, VAG, YAG, WAG, ZAG) of each of the six arms of A-bank inverter and the gate signals (UBG, XBG, VBG, YBG, WBG, ZBG) of each of the six arms of the B-bank inverter from the inputted A-bank inverter output current IA, the B-bank inverter output current IB, the PWM command and the adjustment gain GL for three phases identified by the adjustment gain calculation unit 35.

Each gate signal (UAG, XAG, VAG, YAG, WAG, ZAG) of the A-bank inverter is inputted to the gates of the semiconductor elements constituting each arm of the A-bank inverter. Similarly, the gate signals (UBG, XBG, VBG, YBG, WBG, ZBG) of the B-bank inverter are inputted to the gates of the semiconductor elements constituting the B-bank inverter.

Each arm constituting the A-bank inverter 20A and each arm constituting the B-bank inverter 20B performs a switching operation according to the input gate signal. Then, a voltage and a current of R-phase, S-phase and T-phase of three-phase AC power is outputted. Processing such as calculation by the drive controller 30 is realized by a microcomputer, a DSP (Digital Signal Processor), a system LSI, and the like. As the motor 40, an induction motor or a synchronous motor is used.

Figure 2:
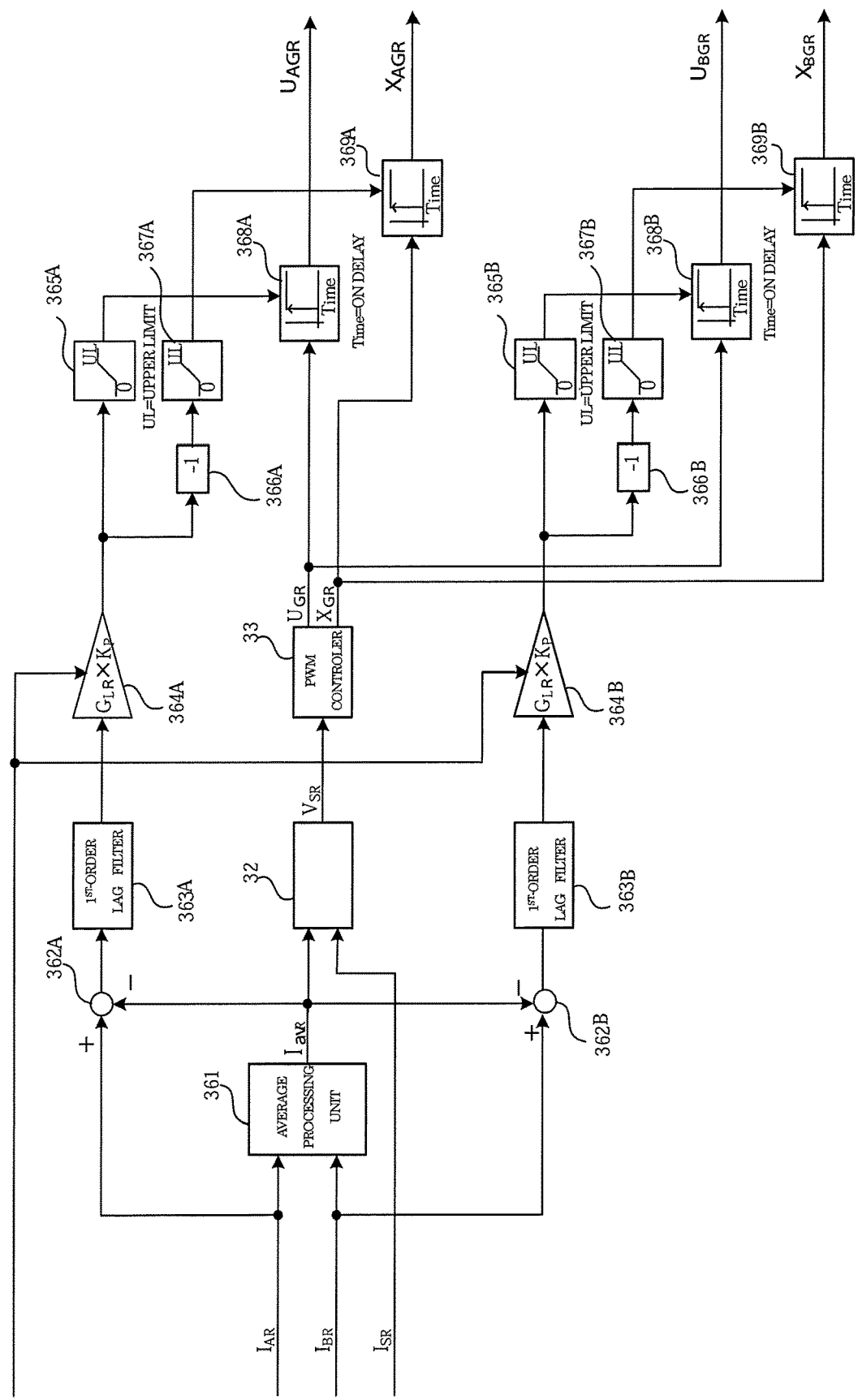
FIG. 2 A block diagram for explaining the operation of the cross current suppressing controller 36 in R-phase when two inverters are connected in parallel without reactor shown in FIG. 1.

FIG. 2 is a block diagram for explaining the operation of the cross current suppressing controller 36 in the R-phase of the A-bank and the R-phase of the B-bank when two inverters are connected in parallel in the configuration shown in FIG. Since the operation in the S-phase and the T-phase of the A-bank and the S-phase and the T-phase of the B-bank are basically the same in operation, they are omitted, and they are explained whenever explanation of different parts is required.

The cross current suppression controller 36 includes the current deviation detection units 362A and 362B, first-order lag filters 363A and 363B, adjustment and proportional gain units 364A and 364B, limiters 365A and 365B, inversion units 366A and 366B, limiters 367A and 367B, Parts 368A, 368B, on-delay units 369A, 369B.

The cross current suppression control method by the cross current suppression controller 36 controls the on-delay time of the PWM command described later calculated from the output current deviation between the inverters constituting the banks, when there is a cross current between the banks. According to this method, the load current can be equalized only by the impedance of the cable, and it is possible to drive the motor by the inverter parallel connection without a reactor, without requiring a double-winding motor.

Hereinafter, description will be made with reference to a block diagram showing a configuration of the illustrated cross current suppression controller 36. Although the illustrated example is a block diagram illustrating the R-phase, the S-phase and the T-phase are configured similarly. The averaging processing unit 39 (average current calculating means) calculates the average current IavR from the A-bank R-phase inverter output current IAR and average current IbvR from the B-bank R-phase inverter output current IBR by following equations (1). Similarly, the S-phase average current IavS and the T-phase average current IavT are also calculated by equations (2) and (3).

$$\text{Iav}_R = (I_{AR} + I_{BR}) \tag{1}$$

$$\text{Iav}_S = (I_{AS} + I_{BS}) \tag{2}$$

$$\text{Iav}_T = (I_{AT} + I_{BT}) \tag{3}$$

The current deviation detecting unit 362A subtracts the average current IavR calculated by the averaging processing unit 39 from the A-bank R-phase inverter output current IAR, and detects the current deviation ΔIAR from the average current IavR, then inputs it to the first-order lag filter 363A.

In order to remove the ripple of the current deviation ΔIAR inputted from the current deviation detecting unit 362A, the first-order lag filter 363A removes noise and inputs it to the adjustment/proportional gain unit 364A. It should be noted that the time constant of the first-order lag filter unit 363A is appropriately selected according to an operation speed, a circuit impedance, a response time of the control circuit, and the like commensurate with the instantaneous value control.

The adjustment/proportional gain unit 364A calculates the current deviation correction value IACR by the following equation (4) using the current deviation ΔIAR inputted from the first-order lag filter 363A, the R-phase adjustment gain GLR outputted from the adjustment gain calculation unit 35, and the proportional gain KP.

$$I_{ACR} = \Delta I_{AR} \times G_{LR} \times K_P \tag{4}$$

The limiter 365A judges whether the current deviation correction value IACR of the A-bank R phase is a positive value and does not exceed the upper limit value UL, and if not exceeding the upper limit value UL, the limiter 365A sets an on-delay time for delaying the ON signal of the PWM command, and outputs it to the on-delay unit 368A.

The on-delay unit 368A outputs a gate signal UAG that turns on the semiconductor device UA of the A-bank inverter 20A after the on-delay time inputted from the limiter 365A of the U-arm PWM command UGR outputted from the PWM controller 33 has elapsed. That is, when the value of the current deviation correction value IACR indicated by the above formula (4) is a positive value, since the output current IAR of the A bank inverter 20A shows a value larger than the average current IavR, the on-delay unit 368A outputs a gate signal UAG for turning on the semiconductor element UA of the A-bank inverter 20A after the on-delay time has elapsed.

In the illustrated example, the current deviation correction value IACR of the A-bank R-phase is inverted by the inverting unit 366A, since the U-arm and the X-arm of the R-phase of the A-bank inverter 20A are configured to include the semiconductor elements UA and XA, and the timings at which the semiconductor elements are turned on and off are in conflict with each other between the semiconductor elements UA and XA. The limiter 367A judges whether or not the reversed current deviation correction value IACR of the R-phase of the A-bank exceeds the upper limit UL. If the current deviation correction value IACR does not exceed the upper limit UL, the limiter 367A sets an on-delay time based on the current deviation correction value IACR, and outputs it to the on-delay unit 369A.

The limiters 365A and 367A output zero when the input is a negative value, and output limit UL when the input exceeds the upper limit UL. The on-delay unit 369A outputs a gate signal XAG that turns on the semiconductor device XA of the A-bank inverter 20A after the ON delay time inputted from the limiter 367A of the X-arm PWM command XGR outputted from the PWM controller 33 has elapsed.

The cross current suppressing control in the R-phase of the A-bank when two inverters are connected in parallel has been mainly described above. As shown in FIG. 2, the cross current suppressing control in the B-bank R-phase is similar, and gate signals UBG and XBG for turning on the semiconductor UB of the B-bank inverter 20B are outputted.

Figure 3A:
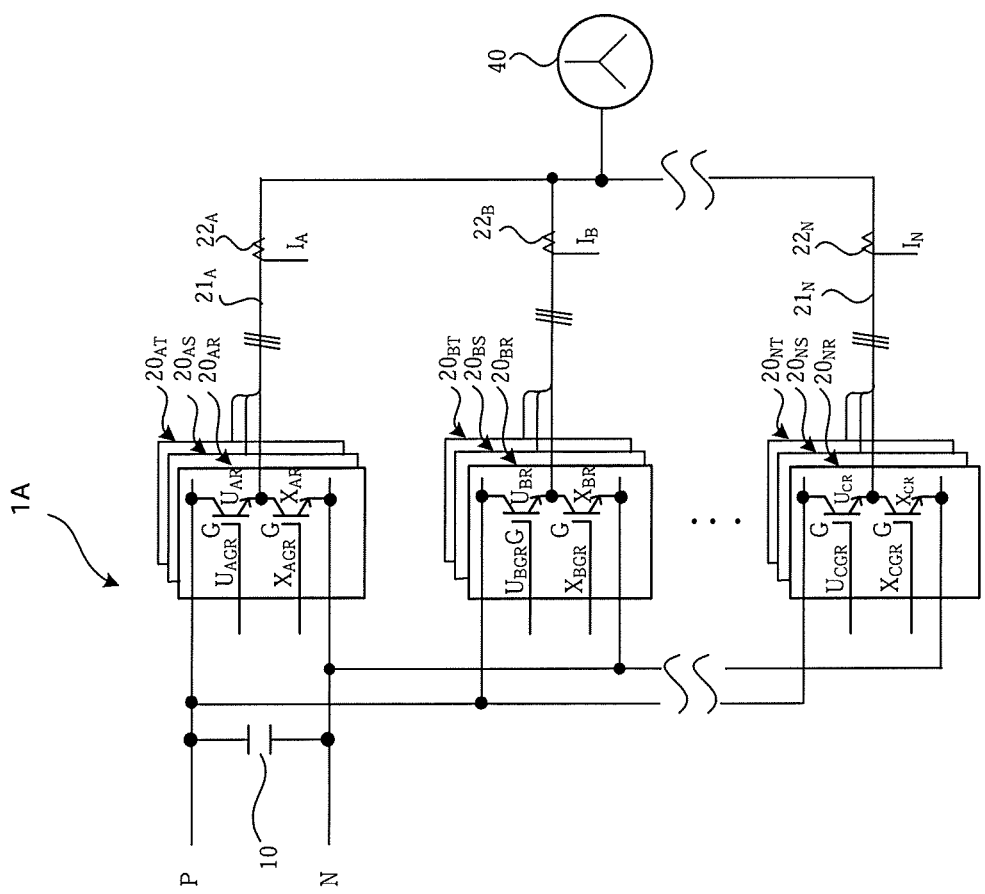
FIG. 3A The schematic configuration diagram of the AC motor drive system 1A when N inverters are connected in parallel according to the first embodiment FIG. 3B The operation of the cross current suppression controller 36 for controlling the gates of the U-arm and X-arm semiconductor elements of the A-bank inverter 20A.
Figure 3B:
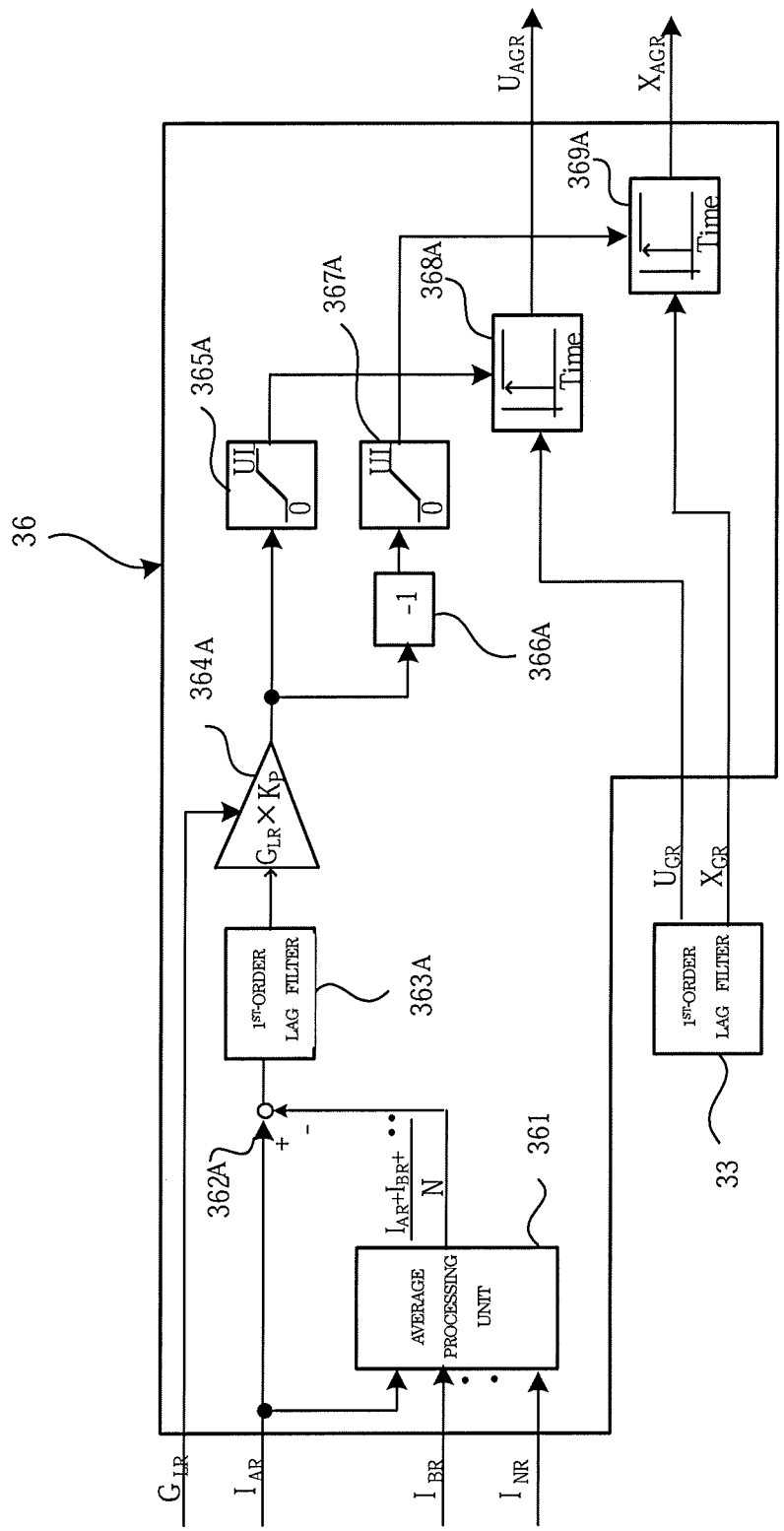

FIG. 3A is a schematic configuration diagram of the AC motor drive system 1A when N inverters according to the first embodiment are connected in parallel and FIG. 3B is a block diagram that explains the operation of the cross current suppressing controller 36 that controls the R-phase gate of the A-bank inverter 20A. In FIG. 3A, from the A-bank inverter 20A to the N-bank inverter 20N connected to the same direct current bus pole-P and pole-N are connected in parallel, the alternating current output thereof is connected to the motor 40 at the input terminal 41. FIG. 3B shows the operation of the cross current suppressing controller 36 for controlling the gate of the R-phase semiconductor element of the A-bank inverter 20A with respect to the gate control of the U-arm and X-arm of the A-bank inverter 20A.

In FIG. 3A, the same parts as those in FIG. 1 are denoted by the same reference numerals, the explanation thereof will be omitted, and the parts to be changed will be explained mainly. Three-phase AC power consisting of R-phase, S-phase and T-phase is outputted from A-bank power line 21A to N-bank power line 21N shown in FIG. 3A, respectively. The R-phase, S-phase, and T-phase power lines of the A-bank power line 21A to the N-bank power line 21N are connected to the three-phase input terminal 41 of the motor 40 for each of the R-phase, the S-phase, and the-T phase.

The cross current suppressing controller 36 in FIG. 3B includes an averaging processing unit 39, a current deviation detecting unit 362A, a first-order lag filter 363A, an adjustment/proportional gain unit 364A, a limiter 365A, an on-delay unit 366A, a reversing unit 367A, an upper limit unit 368A, an on-delay unit 369A.

Here, the current deviation detecting unit 362A (current deviation detecting means), the first-order lag filter 363A, the adjustment/proportional gain unit 364A, the limiter 365A, the on-delay unit 366A (on-delay value computing means), the reversing unit 367A, the upper limit unit 368A and the on-delay unit 369A are the same as the operation of the cross current suppressing controller 36 in the R-phase shown in FIG. 2, and a description thereof will be omitted.

The averaging processing unit 39 (average current calculating means) shown in the drawing calculates the average current IavR of the A bank inverter R-phase output current IAR to the N-bank inverter R-phase output current INR by the following equation (5). Similarly, the S-phase average current IavS and the T-phase average current IavT (equations (6) and (7)) are also calculated.

$$\text{Iav}_R = (I_{AR} + I_{BR} + \ldots + I_{NR})/N \quad (5)$$

$$\text{Iav}_S = (I_{AS} + I_{BS} + \ldots + I_{NS})/N \quad (6)$$

$$\text{Iav}_T = (I_{AT} + I_{BT} + \ldots + I_{NT})/N \quad (7)$$

The current deviation detecting unit 362A subtracts the average current IavR of the inverter R-phase output current from the first bank inverter R-phase output current IRA to calculate the current deviation ΔIAR from the average current IavR. The limiter 365A judges whether or not the current deviation correction value IACR of the A-bank R-phase calculated by the above formula (4) is a positive value and does not exceed the upper limit value UL, and if not exceeding the upper limit current, sets an on-delay time based on the deviation correction value IACR, and outputs it to the on-delay unit 368A. When the input is a negative value, the limiter 365A sets the output to zero, and outputs the limit UL when the input exceeds the upper limit UL.

The on-delay unit 368A outputs a gate signal UAG that turns on the U-arm of the A-bank R-phase inverter 20A after the on delay time inputted from the limiter 365A for the R-phase PWM command UG outputted from the PWM controller 33 has elapsed. The operation of the inverting unit 366A, the limiter 367A, and the on-delay unit 369A is the same as that described with reference to FIG. 2. The on delay unit 369A outputs a gate signal XAG that turns on the X-arm of the A-bank inverter 20A after the ON delay time inputted from the limiter 367A of the PWM command XGR outputted from the PWM controller 33 has elapsed.

Figure 4:
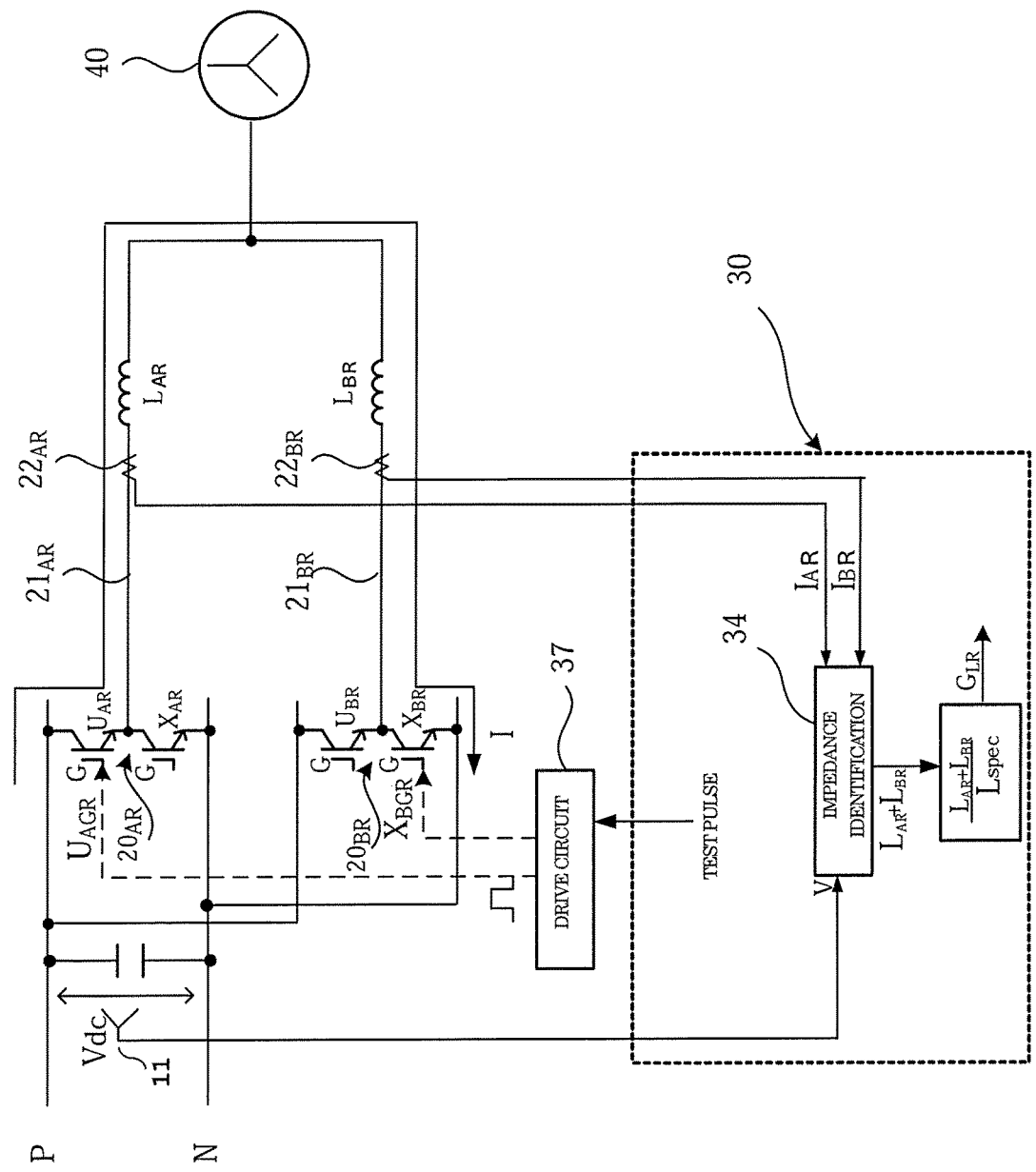
FIG. 4 A diagram showing a method of identifying a laying cable impedance and calculating adjusting gain in R-phase by a test pulse in the case where the number of inverters connected in parallel according to the first embodiment is two.

FIG. 4 is a diagram showing a method of identifying the impedance and a calculating adjustment gain of the installation cable in the R-phase by the test pulse in the case where the number of inverters connected in parallel according to the first embodiment is two. In the present embodiment, a cable impedance laid is used in place of the reactor.

Before operating the motor 40, the drive control unit 30 outputs a test pulse command for turning on the semiconductor element UA connected to the P-pole side of A-bank inverter 20A and a test pulse command for turning on the semiconductor element XB connected to the N-pole side of B-bank inverter 20B among the two inverters (A-bank inverter 20A, B-bank inverter 20B) connected in parallel. The impedance identifying unit 34 identifies the cable impedance (LAR+LBR) from the DC voltage Vdc at the time of outputting the test pulse and the response current (IAR, IBR) by the test pulse output. Similarly, cable impedance (LAS+LBS) is identified by implementing S-phase, and cable impedance (LAT+LBT) is identified by carrying out on T-phase.

The test pulse is supplied from the drive circuit 37 connected to the output of the cross current suppressing controller 36 of the drive control unit 30 to the gate of the P-pole side semiconductor device UA constituting the A-bank inverter 20A as the A-bank inverter gate signal UAG. Likewise, it is outputted as the B bank inverter gate signal XBG to the gate of the N-pole side semiconductor element constituting the B-bank inverter 20B. Although the illustrated drive circuit 37 is provided outside the drive control unit 30, it also fulfills the constituent features of the present invention even if it is provided internally as a function of the cross current suppression controller 36.

Since the impedance of the large capacity electric motor is much larger than the impedance of the cable, it can be ignored as a current does not flow through the electric current path through the motor 40.

Therefore, the laying cable impedance (RAR+LBR) of the R phase can be obtained by the following equation (8).

$$L_{AR} + L_{BR} = (Vdc - Vf \times Tp)/I_{PR} \quad (8)$$

Here, Vdc is the voltage of the DC circuit, Tp is the pulse width of the gate signals UBG and XBG outputted as the test pulse, IPR is the peak value of the absolute value of the response R-phase current (IAR, IBR) measured by the current sensor 22AR and the current sensor 22BR when the test pulse is outputted. Vf is a total value of forward voltage drops of the semiconductor element UA and the semiconductor element XB.

Incidentally, the response currents IAR and IBA are basically equal, but when they are different, the average of the peak values of IAR and IBR may be used. In the same way, it can be determined the laying cable impedance (LAS+LBS) of the S-phase and the laying cable impedance (LAT+LBT) of the T-phase. The identified R-phase laying cable impedance (LAR+LBR), S-phase laying cable impedance (LAS+LBS) and T-phase laying cable impedance (LAT+LBT) are sent from the impedance identifying unit 34 to the adjustment gain calculating unit 35.

AS a result, regardless of the facility situation, the adjustment gain calculating unit 35 shown in FIG. 1 sets the R-phase adjustment gain GLR for optimizing the cross current suppression control gain as a ratio of the laying cable impedance (LAR+LBR) to the specification cable impedance LSPEC. It is shown in the following equation (9).

$$G_{LR}=(L_{AR}+L_{BR})/L_{SPEC} \quad (9)$$

The gain optimization is made possible by multiplying the calculated R-phase adjustment gain GLR by the standardized setting proportional gain Kp of the cross current suppression control. The above-described R-phase adjustment gain GLR is calculated for the R-phase between the A-bank inverter and the B-bank inverter. Similarly, the S-phase adjustment gain GLS between the A-bank inverter and the B-bank inverter and the T-phase adjustment gain GLT between the A-bank inverter and B-bank inverters is calculated.

In general, since the R-phase, S-phase and T-phase power lines are housed and laid in the same cable, it is assumed that the cable impedance (LA+LB) is not likely to have different values due to the difference in phase, it is possible to use the adjustment gain GL (generic name when the adjustment gains GLR, GLS, GLT are not particularly distinguished) calculated for each phase based on the measurement result by the above-described test pulse. The cable impedance LA is a generic name when the cable impedances LAR, LAS and LAT are not particularly distinguished, and the cable impedance LB is a generic name when the cable impedances LBR, LBS, LBT are not particularly distinguished AS shown in FIG. 2, the GLR calculated above is sent to the adjustment/proportional gain units 364A and 364B when the two inverters are driven, and adjusts the on-delay time of each gate signal of the semiconductor element of the U-arm and the X-arm of the A-bank and B-bank individually. In this manner, cross current suppression control between the A-bank and the B-bank of the R-phase is performed. The gate signals of the semiconductor elements of the V, Y, W, Z arms constituting the A-bank inverter S-phase and the T-phase, the B-bank inverter S-phase and the T-phase are similarly outputted.

AS a result, cross current between two inverters connected in parallel can be suppressed.

In the cross current suppressing control of the present embodiment described above, the output obtained by multiplying the deviation of the current by the proportional gain KP (in the case where the cable is laid by the impedance specified by the specification) is handled as the on-delay time, which can be regarded as one type of current control with one polarity.

In the closed-loop current control system composed of the proportional gain KP and in the case when the load is inductance L, the time constant of the ideal transfer function without delay is expressed by L/KP, so when the ratio of the proportional gain and the inductance is constant, the time constant is unchanged.

From these relationships, by calculating the ratio of the laying impedance to the specification impedance of the cable and multiplying it to the proportional gain of the cross current suppression control, it is possible to keep the response constant without deteriorating a response time.

Figure 5:
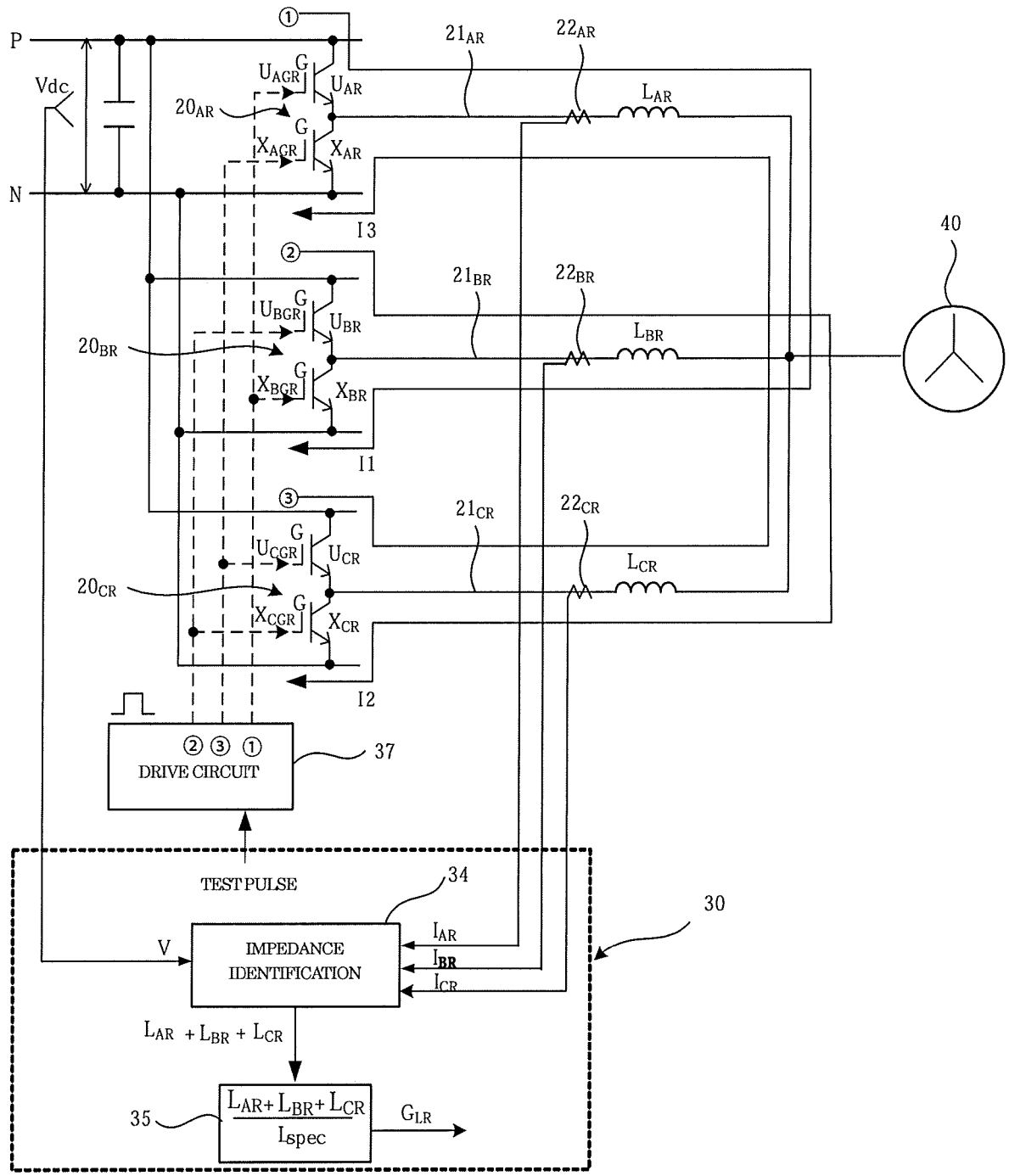
FIG. 5 A diagram showing a method of identifying a laying cable impedance and calculating adjusting gain in R-phase by a test pulse when the number of inverters connected in parallel according to the first embodiment is three.

FIG. 5 is a diagram showing a method of identifying a laying cable impedance and calculating adjustment gain in R-phase by a test pulse when the number of inverters connected in parallel according to the first embodiment is three. Since the basic idea is the same as the method of calculating the impedance identifying and adjusting gain in the R-phase by the test pulse in the case where the number of parallel connected inverters shown in FIG. 4 is two, the same reference numerals are used for the same parts descriptions are omitted, and different parts are explained.

Before operating the motor 40, the drive control unit 30 outputs the following test pulse command to the three inverters (A-bank inverter 20A, B-bank inverter 20B, and C-bank inverter 20C) connected in parallel.

(1) A test pulse command for turning on the P-side semiconductor element UA is outputted to the A-bank inverter 20A, and a test pulse command for turning on the N-pole side semiconductor element XB is outputted to the B-bank inverter 20B. The cable impedance (LAR+LBR) is identified from the DC voltage Vdc at the time of outputting the test pulse and the response current (IAR, IBR) by the test pulse output. This operation is done in each phase.

(2) Next, a test pulse command for turning on the P-side semiconductor element UB is outputted to the B-bank inverter 20B, and a test pulse command for turning on the N-pole side semiconductor element XC is outputted to the C-bank R-phase inverter 20C. The cable impedance (LBR+LCR) is identified from the DC voltage Vdc at the time of outputting the test pulse and the response current (IBR, ICR) by the test pulse output. This operation is done in each phase.

(3) Next, a test pulse command for turning on the P-pole side semiconductor element UC is output to the C-bank R-phase inverter 20C, and a test pulse command for turning on the N-pole side semiconductor element XA to the A-bank R-phase inverter 20A. The cable impedance (LCR+LAR) is identified from the DC voltage Vdc at the time of outputting the test pulse and the response current (ICR, IAR) by the test pulse output. This operation is done in each phase.

For the method of identifying the cable impedance (LAR+LBR+LCR), for example, when the values of the cable impedances (LAR+LBR), (LBR+LCR) and (LCR+LAR) identified in the above items, (1) to (3) are summed, then 2×(LAR+LBR+LCR) can be obtained.

The test pulse is outputted from the drive circuit 37 connected to the output of the cross current suppressing controller 36 of the drive controller 30. Since the impedance of the large capacity motor is much larger than the impedance of the cable, it can be ignored that a current does not flow through the electric current path of the motor 40.

As a result, regardless of the facility situation, the adjustment gain calculating unit 35 shown in FIG. 1 sets the R-phase adjustment gain GLR for optimizing the cross current suppression control gain as the ratio of laying cable impedance (LAR+LBR+LCR) to the specification cable impedance LSPEC based on the specification. It is shown in the following equation (10).

$$G_{LR}=(L_{AR}+L_{BR}+L_{CR})/L_{SPEC} \quad (10)$$

The gain optimization in the R phase is made possible by multiplying the calculated R-phase adjustment gain GLR by the standardized setting proportional gain Kp of the cross current suppressing control (optimized adjusted gain=GL× KP). The R-phase adjustment gain GLR described above is calculated for the R-phase of the A-bank inverter 20A, the B bank inverter 20B, and the C bank inverter 20C. Similarly, the adjustment gain GLS is also calculated for the S-phase of the A-bank inverter 20A, the B-bank inverter 20B, and the C-bank inverter 20C. Similarly, the adjustment gain GLT is also calculated for the T-phases of the A-bank inverter 20A, the B-bank inverter 20B, and the C-bank inverter 20C.

In general, since the R-phase, S-phase and T-phase power lines are housed and laid in the same cable, it is assumed that the cable impedance (LA+LB) is not likely to have different values due to the difference in phase, it is possible to use the adjustment gains GLR, GLS, GLT for each phase calculated based on the measurement result by the above-described test pulse.

Using the adjustment gain GLR calculated in this manner, the current deviation correction value IACR shown in the above equation (4) can be obtained when the three inverters are driven (during motor operation). The on-delay time UAd of the A-bank U-arm is calculated from the PWM command UGR generated based on the current deviation correction value IACR. Then, the gate signal UAG for turning on the semiconductor element UAR corrected by the calculated on-delay time UAd is outputted.

Similarly, the on-delay time XAd of the A-bank X-arm is calculated based on the PWM command XG, and the gate signal XAG that turns on the semiconductor element XA corrected by the calculated on-delay time XAd is outputted. Similarly, based on the adjustment gain GLR, gate signals UBG and XBG for turning on the semiconductor elements UB and XB of the B-bank U-arm and X-arm are outputted. Similarly, based on the adjustment gain GLR, gate signals UCG and XCG for turning on the semiconductor elements UC and XC of the C-bank U-arm and X-arm are outputted.

The above-described process is similarly performed for S-phase and T-phase. As a result, three inverters connected in parallel can be driven without using a reactor for suppressing cross current between three inverters.

Figure 6:
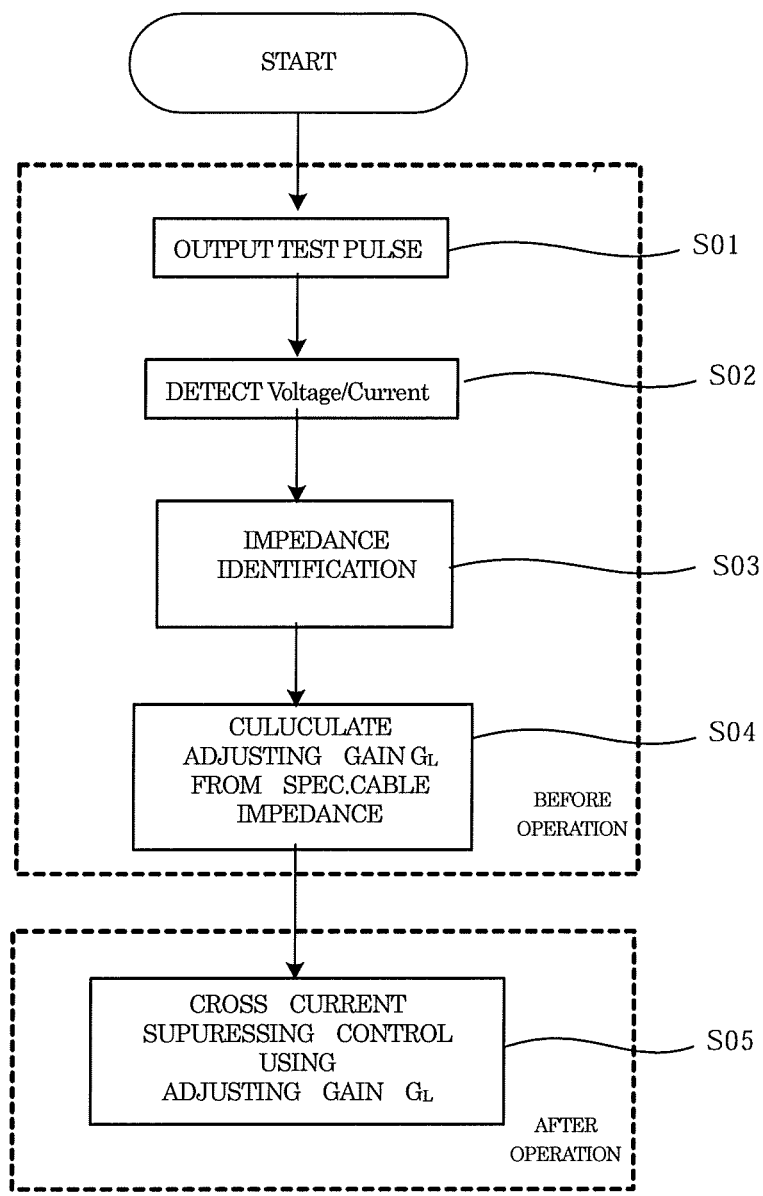
FIG. 6 A flowchart of optimization of cross current suppression control adjustment gain and a flow chart of operation according to the first embodiment.

FIG. 6 is a flow chart of optimization of the cross current suppression control adjustment gain and operation during motor drive according to the first embodiment. This flowchart is not limited to the case where the number of parallel connected inverters described with reference to FIG. 4 is two, or in the case where the number of parallel connected inverters described with reference to FIG. 5 is three, but can be applied the number of inverters to be connected in parallel is N to optimize the cross current suppression control adjustment gain by a test pulse and operation flow during motor drive. The following description will be made.

<Pre-Motor Drive Operation Processing>
(1) When the number of parallel connected inverters is 2, refer to FIG. 4, and when the number of parallel connection is 3, refer to FIG. 5, the on and off test pulses of P-pole and N-pole semiconductor element set by the number of parallel connections are outputted to the laying cable. (S01)
(2) Detect the DC voltage (voltage) and response current (inverter output current) at the time of outputting the test pulse to the laying cable. (S02)
(3) The impedance of the laying cable is identified from the voltage and current detected in the above (2). (S03)
(4) The adjustment gain GL is calculated from the ratio of the installation cable impedance L to the cable impedance LSPEC based on the specification of the installation cable.

The calculated adjustment gain GL is multiplied by the standardized setting proportional gain KP of the cross current suppressing control to optimize the adjustment gain. (S04)

<Processing at Motor Drive Operation>
(5) The cross current suppressing controller 36 calculates an on-delay time based on the optimized adjustment gain (GL×KP) calculated by the pre-operation process and outputs the corrected gate signal by the calculated on-delay time to corresponding inverter gates. This method can be applied regardless of the number of inverters connected in parallel.

AS described above, according to the embodiment of the present invention, in the motor drive system in parallel inverter connection, by optimizing the cable impedance of each phase by the test pulse before operation of the motor and optimizing the cross current suppression control adjustment gain, it is possible to optimize the control performance of the cross current suppression control and to provide a power conversion apparatus capable of performing auto tuning.

While certain embodiment have been described, the embodiment has been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

DESCRIPTION OF THE SYMBOLS

1 MOTOR DRIVE SYSTEM
10 SMOOTHING CAPACITOR
11 DC VOLTAGE DETECTOR
$20_A$ A-BANK INVERTER
$20_B$ B-BANK INVERTER
$20_C$ C-BANK INVERTER
$20_N$ N-BANK INVERTER
$20_{NR}$ N-BANK R-PHASE INVERTER
$21_A$ A-BANK POWER LINE (CABLE)
$21_B$ B-BANK POWER LINE (CABLE)
$21_N$ N-BANK POWER LINE (CABLE)
$22_A$ A-BANK CURRENT SENSOR
$22_B$ B-BANK CURRENT SENSOR
$22_C$ C-BANK CURRENT SENSOR
$22_N$ N-BANK CURRENT SENSOR
30 DRIVE CONTROLLER
31a, 31b, 31c A/D CONVERTER
32 CURRENT CONTROLLER
33 PWM CONTROLLER
34 IMPEDANCE IDENTIFICATION UNIT
35 ADJUSTMENT GAIN CULCULATION UNIT
36 CROSS FLOW SUPRESSION CONTROLLER
37 DRIVE CIRCUIT
39 AVERAGING PROCESSING UNIT
40 MOTOR
41 INPUT TERMINAL

The invention claimed is:
1. A power conversion apparatus configured to drive a motor having a plurality of PWM power converters with a common DC circuit and with their outputs connected in parallel, a DC voltage detector for detecting DC voltage values supplied to the PWM power converters of the plurality of banks, current sensors for respectively detecting the output currents of the PWM power converters of the plurality of banks, a drive controller for controlling the plurality of PWM power converters, the drive controller comprising:

a PWM controller for outputting a PWM command for controlling a gate of semiconductor elements constituting the PWM power converter;

test pulse output unit for outputting a test pulse for turning on/off a positive side semiconductor element and a negative side semiconductor element set by the number of parallel connection;

an impedance identification unit for identifying a laying cable impedance from a output current acquired by the current sensor, at the time of test pulse generation output by the test pulse output unit before operation of the motor, and from a DC voltage of the PWM converter acquired by the DC voltage detector;

an adjustment gain calculation unit for calculating adjustment gain of cross current suppression control based on the ratio of the installation cable impedance identified by the impedance identification unit to the specification cable impedance calculated from the specification of the installation cable;

and a PWM command correction unit during motor drive operation for correcting the PWM command output from the PWM controller by the adjustment gain calculated by the adjustment gain calculation unit before the motor drive operation.

2. A power converter having first and second converters according to claim 1, wherein, the impedance identification unit identify the laying cable impedance from first and second output currents acquired by first and second current sensors, at the time when test pulse generation commands are outputted to the semiconductor element connected to the positive pole side of a first PWM converter and to the semiconductor element connected to the negative pole side of the same phase of a second PWM converter, so that the current flows from the first converter to the second converter via the laying cable, and from the DC voltage of the PWM converter acquired by the DC voltage detector.

3. A power converter having first, second and third converters according to claim 1, wherein, the impedance identification unit identify the laying cable impedance from first, second and third output currents acquired by first, second and third current sensors, at the time when a test pulse generation commands are outputted to the first PWM converter and to the second PWM converter, so that the current flows from the first converter to the second converter via the laying cable, and at the time when a test pulse generation commands are outputted to the second PWM converter and to the third PWM converter, so that the current flows from the second converter to the third converter via the laying cable, and at the time when a test pulse generation commands are outputted to the third PWM converter and to the first PWM converter, so that the current flows from the third converter to the first converter via the laying cable, individually, and from the DC voltage of the PWM converter acquired by the DC voltage detector.

4. A power converter according to claim 1, further comprising:

an average current calculation unit for calculating an average current of output current values of the plurality of PWM power converters detected by the current sensors;

a current deviation detection units for detecting a current deviation by subtracting the average current calculated by the average current calculation unit from the output current value of each of the plurality of PWM converters acquired by the current sensors;

a current deviation correction value calculation unit for calculating a current deviation correction value from the product of the current deviation calculated by the current deviation detection unit and the adjustment gain and proportional gain calculated by the adjustment gain calculation unit;

and an on delay setting means for setting an on delay time for delaying the on signal of the PWM command when the current deviation correction value calculated by the current deviation correction value calculation unit satisfies a predetermined requirement.

5. A power converter according to claim 4, wherein, the predetermined requirement is that, an on-delay time based on the current deviation correction value is set only when the current deviation correction value is a positive value and it does not exceed the upper limit value.

* * * * *